(12) United States Patent (10) Patent No.: US 9,126,362 B2
Tan (45) Date of Patent: Sep. 8, 2015

(54) APPARATUS AND METHOD FOR CORONA TREATING FILM FOR SELF OPENING BAGS

(71) Applicant: Daniel Brian Tan, Harahan, CA (US)

(72) Inventor: Daniel Brian Tan, Harahan, CA (US)

( * ) Notice: Subject to any disclaimer, the term of this patent is extended or adjusted under 35 U.S.C. 154(b) by 214 days.

(21) Appl. No.: 13/869,629

(22) Filed: Apr. 24, 2013

(65) Prior Publication Data

US 2013/0228954 A1 Sep. 5, 2013

Related U.S. Application Data

(63) Continuation of application No. PCT/US2012/020511, filed on Jan. 6, 2012.

(51) Int. Cl.
 *B29C 59/14* (2006.01)
 *B29C 59/10* (2006.01)

(52) U.S. Cl.
 CPC .................. *B29C 59/14* (2013.01); *B29C 59/10* (2013.01)

(58) Field of Classification Search
 CPC .............................. B29C 59/14; B29C 59/10
 USPC .......................................... 264/447; 425/174.4
 See application file for complete search history.

(56) References Cited

U.S. PATENT DOCUMENTS

| 3,391,044 | A | * | 7/1968 | Kaghan et al. ................ 427/536 |
| 3,391,070 | A | | 7/1968 | Morgan |
| 3,409,537 | A | | 11/1968 | Cannon |
| 3,419,489 | A | * | 12/1968 | Delaney, Jr. ............. 422/186.05 |
| 3,503,859 | A | | 3/1970 | Goncarovs et al. |
| 4,096,013 | A | * | 6/1978 | Lutzmann et al. ......... 156/272.6 |
| 4,310,478 | A | * | 1/1982 | Balslev et al. ................ 264/448 |
| 4,755,424 | A | * | 7/1988 | Takeoka et al. .............. 428/323 |
| 5,469,969 | A | | 11/1995 | Huang |
| 5,484,376 | A | | 1/1996 | Prader et al. |
| 5,562,580 | A | | 10/1996 | Beasley et al. |
| 5,605,607 | A | * | 2/1997 | LaRose et al. ................ 204/164 |
| 5,690,229 | A | | 11/1997 | Piraneo et al. |
| 5,695,064 | A | | 12/1997 | Huang et al. |
| 5,863,130 | A | | 1/1999 | Nguyen |
| 5,906,798 | A | | 5/1999 | Schuelke et al. |
| 5,938,003 | A | | 8/1999 | Huber et al. |
| 5,965,250 | A | * | 10/1999 | Takeuchi et al. .......... 428/308.4 |
| 6,105,780 | A | | 8/2000 | Nguyen |
| 6,153,059 | A | | 11/2000 | Wadsworth et al. |
| 6,429,595 | B1 | | 8/2002 | Hammen et al. |
| 6,624,413 | B1 | * | 9/2003 | Klein ............................ 250/324 |
| 6,942,100 | B2 | | 9/2005 | Su |
| 2002/0030161 | A1 | * | 3/2002 | Washebeck et al. .......... 250/324 |
| 2004/0074620 | A1 | * | 4/2004 | Nissinen et al. .............. 162/135 |
| 2005/0103679 | A1 | | 5/2005 | Smithson |

(Continued)

*Primary Examiner* — Nahida Sultana
(74) *Attorney, Agent, or Firm* — David A. Belasco; Belasco Jacobs & Townsley, LLP

(57) ABSTRACT

An apparatus for corona treating film includes a source of film material and at least one transport roller that is rotatably mounted in a frame. The transport roller has a longitudinal axis and has a width greater than the film. First and second treater heads have first and second leading edges, first and second trailing edges and are mounted parallel to the longitudinal axis. The second leading edge is parallel to and spaced from the first trailing edge by a second predetermined distance. The film is transported over the roller and a high voltage electric arc is provided to the first and second treater heads. The roller is grounded and provides a return path for the electric current provided to the first and second treater heads, thereby corona treating the front side or back side of the film if a second roller and third and fourth treater heads are used.

28 Claims, 10 Drawing Sheets

(56) References Cited

U.S. PATENT DOCUMENTS

| | | |
|---|---|---|
| 2006/0283765 A1 | 12/2006 | Smithson et al. |
| 2009/0085259 A1* | 4/2009 | Nishi et al. ............ 264/469 |
| 2011/0081610 A1* | 4/2011 | Herko et al. ............ 430/132 |
| 2012/0114873 A1* | 5/2012 | Yosomiya et al. ............ 427/536 |
| 2014/0299517 A1* | 10/2014 | Fuse ............ 209/129 |
| 2014/0318703 A1* | 10/2014 | Gong et al. ............ 156/272.6 |
| 2015/0111040 A1* | 4/2015 | Funatsu et al. ............ 428/410 |

\* cited by examiner

|  | Current (AMP) | Theta [deg] | | | | |
| --- | --- | --- | --- | --- | --- | --- |
|  |  | Average | Std Dev | 95% CI | | |
|  |  |  |  | CI, +/- | Upper limit | Lower limit |
| Single Head Treater | 2.5 | 78 | 4.5 | 3.2 | 81.5 | 75.1 |
| Single Head Treater | 3.0 | 84 | 5.8 | 4.1 | 87.9 | 79.6 |
| Single Head Treater | 3.5 | 81 | 4.3 | 3.1 | 83.9 | 77.7 |
| Single Head Treater | 3.9 | 86 | 4.5 | 3.2 | 88.8 | 82.3 |
| Dual Head Treater | 2.5 | 77 | 3.2 | 2.3 | 78.9 | 74.3 |
| Dual Head Treater | 3.0 | 78 | 3.2 | 2.3 | 80.4 | 75.8 |
| Dual Head Treater | 3.5 | 80 | 3.9 | 2.8 | 82.6 | 77.0 |
| Dual Head Treater | 3.9 | 72 | 3.5 | 2.5 | 74.9 | 69.9 |

FIG. 9

APPARATUS AND METHOD FOR CORONA TREATING FILM FOR SELF OPENING BAGS

RELATED APPLICATIONS

The instant application is a continuation of Application Serial No. PCT/US2012/020511, filed Jan. 6, 2012 and claims priority therefrom and incorporates the same by reference in its entirety.

FIELD OF INVENTION

This invention relates to the field of merchandise bags, and more specifically to an improved method and apparatus for corona treating film for purposes of creating self opening bags and printing on the film.

BACKGROUND OF THE INVENTION

Corona treatment of plastic film has long been used in the production of merchandise bags. This application of high voltage electricity to the surface of the film alters the bond structure of the film material and increases the relative tackiness of the film over untreated film. The increase in tackiness is desirable in that it increases the adhesion of ink to the film. The increase in tackiness is also desirable in that it increases the adhesion of one bag surface to another. This permits the development of self-opening bags in which the rear surface of one bag adheres to the front surface of a subsequent bag, allowing the first bag to pull the subsequent bag open upon dispensing of the first bag. Many variations upon the methods of corona treating of plastic and other film materials have been developed as shown in the following references.

U.S. Pat. No. 5,469,969, issued to Huang, discloses a self-opening plastic bag pack system. The self-opening feature of the bags described and manufactured in accordance with the method in this patent depends upon a central tab portion, wherein the central tab portions are heat welded together. The manufacturing process involves the use of a cold and somewhat thick and dull die blade to form the tearing cut and thus the pack of bags are cold pressed together to create frangible pressure bonding of the rear wall of handles of the top bag to the forward wall of the handles of the next bag. This cold pressing process may be different than the localized pressure that is used to create adhesion normally found in the prior art. The individual bags are formed from a continuous tube of plastic material which is treated on its entire outside surface (both top and bottom or front and back) by corona surface treatment, wherein the plastic material is passed over guide rollers and treatment rollers which are grounded. Discharge electrode bars are spaced slightly over the plastic material to surface treat the entire surface of the plastic material. Electrode bars are located both above and below, grounded in treatment rollers.

U.S. Pat. No. 5,484,376, issued to Prader is directed to a ready to load bag pack and the method of forming said system. In order to obtain a bag pack with satisfactory self-opening properties, wherein the second bag in the stack is opened at the mouth when the first bag is removed from the stack, it has been found that the desirable property may be achieved by placing corona discharge treated polyethylene film surfaces together and this is achieved by treating the complete outside surface as opposed to only one surface (top or bottom). The schematic representation of the method used in this invention is seen in FIG. 3 wherein the film of thermoplastic material is passed between two oppositely disposed corona discharge treaters which are positioned to treat outside surfaces (both top and bottom) of the collapsed tube. The region may be uniformly treated or may be treated in interrupted areas such as in dots, squares, or stripes in order to achieve the necessary adhesion so that the mouth region of a next succeeding bag will be opened to a meaningful extent upon removal of a first bag.

U.S. Pat. No. 3,391,070, issued to Morgan, is directed to a method of selectively treating a plastic film to improve anchorage characteristics is another example of a plastic film being treated on both sides of a collapsed tube by means of first treater bar and a second treater bar located on opposing sides of two grounded backup rollers.

U.S. Pat. No. 3,509,859, issued to Concarovs et al. is directed to corona discharge treatment of polymer film to increase the adhesion characteristics thereof. This patent provides another example of a plastic web being treated on both outside surfaces as it passes under and over a pair of grounded rollers and treated by a pair of electrodes in order to achieve the corona discharge treatment on both surfaces of the web.

U.S. Pat. No. 6,153,059, issued to Wadsworth et al. is directed to a composite of pleated and non-woven webs and the method and apparatus for the electrostatic charging of same. A web of thermoplastic material is charged on both sides by means of a pair of charging bars opposed by a pair of charging drums wherein the web is charged on the two sides to different polarities.

U.S. Pat. No. 5,669,504, issued to Leone et al. is directed to a thermoplastic bag closure. It includes the processing of a film material by two oppositely disposed corona discharge treaters positioned so as to treat the outside surfaces of the collapsed tubes.

U.S. Pat. No. 6,942,100, issued to Su discloses a square bottomed plastic bag stack and method of making the same. Among the features seen for the plastic bag packs described in this patent, includes the means for attaching the upper portion of the rear wall of a leading bag to an upper portion of a front wall of a subsequent bag in the stack. Thus, when the leading bag is pulled from the stack, the subsequent bag will cause the leading bag to open. The means for attaching the upper portion of the rear wall of a leading bag to the upper portion of the front wall of a subsequent bag may be selected from the group that includes corona treatment alone, as opposed to pressure alone and/or corona treatment with pressure.

U.S. Pat. No. 5,690,229, issued to Piraneo et al. discloses an easy dispense T-shirt bag. This patent addresses the issue of preparing an easy-opening plastic bag system by controlling the power of the corona discharge so that the interior surfaces of the bags are not welded together. Furthermore, the pressure welding involved in the formation of these bags, requires no additional steps in the manufacturing process, and furthermore, a static charge may be induced on the bag so that each bag is at a different voltage, thus resulting in individual bags attracting one another while the panels of the individual bags repel one another.

It is an objective of the present invention to provide a method and apparatus for corona treating bag film material so as to provide improved tackiness of the material. It is a further objective to provide such an improvement in surface tackiness without a decrease in film treating speed. It is a still further objective of the invention to provide the improvement without requiring greater amounts of electric power. It is yet a further objective to provide a sufficient increase in tackiness to allow for the construction of self opening bags without the need for localized pressure on a bag stack. Finally, it is an objective of the present invention to provide such benefits with relatively minor changes in treating equipment requirements.

While some of the objectives of the present invention are disclosed in the prior art, none of the inventions found include all of the requirements identified.

SUMMARY OF THE INVENTION

The present invention addresses all of the deficiencies of prior art apparatus for corona treating film inventions and satisfies all of the objectives described above.

(1) An apparatus for corona treating film providing the desired features can be assembled from the following components. A supply source is provided. The source provides a continuous web of film material for corona treating. A first transport roller is provided. The first roller is rotatably mounted in a frame, has a first longitudinal axis and has a width greater than the film. A first front side treater head is provided. The first front side head has a first face, a first leading edge, a first trailing edge, a first width, a first length and is located at a first predetermined distance from the first roller. The first leading edge is parallel to the first axis.

A second front side treater head is provided. The second front side head has a second face, a second leading edge, a second trailing edge, the first width, the first length and is located at the first predetermined distance from the first roller. The second leading edge is parallel to the first axis and spaced from the first trailing edge by a second predetermined distance. The film emerges from the supply source, continuing over the first transport roller in a first direction. A high voltage power supply is provided. The power supply provides a high voltage electric current to the first and second front side treater heads. The first transport roller is grounded and provides a return path for the electric current provided to the first and second front side treater heads. A high voltage electric arc will pass through the film in a first path as it moves between the first and second front side treater heads and the first transport roller, thereby corona treating a front side of the film.

(2) In a variant of the invention, a second transport roller is provided. The second roller is rotatably mounted in the frame, has a second longitudinal axis parallel to and spaced from the first axis and has a width greater than the film. A first back side treater head is provided. The first back side head has a third face, a third leading edge, a third trailing edge, the first width, the first length and is located at the first predetermined distance from the second roller. The third leading edge is parallel to the second axis.

A second back side treater head is provided. The second back side head has a fourth face, a fourth leading edge, a fourth trailing edge, the first width, the first length and is located at the first predetermined distance from the second roller. The fourth leading edge is parallel to the second axis and spaced from the third trailing edge by the second predetermined distance. The film emerges from the first transport roller in the first direction, continuing over the second transport roller in a second direction opposite to the first direction and is wound onto a receiving roller. A high voltage power supply is provided. The power supply provides a high voltage electric current to the first and second back side treater heads. The second transport roller is grounded and provides a return path for the electric current provided to the first and second back side treater heads. A high voltage electric arc will pass through the film in a second path as it moves between the first and second back side treater heads and the second transport roller, thereby corona treating a back side of the film.

(3) In another variant, a powered receiving roller is provided. The powered receiving roller has a longitudinal axis parallel to and spaced from the first axis and has a width greater than the film. The film emerges from the first transport roller and is wound onto the powered receiving roller.

(4) In still another variant, a powered receiving roller is provided. The powered receiving roller has a longitudinal axis parallel to and spaced from the first axis and has a width greater than the film. The film emerges from the second transport roller and is wound onto the powered receiving roller.

(5) In yet another variant, the treater heads each include at least one treater element. The treater element is of modular design to permit adjustment of a width of treatment area on the film.

(6) In a further variant, the treater elements include a flat plate of electrically conductive material. The plate has a first predetermined thickness. The plate has a treating portion and an attaching portion. The treating portion has a curved profile. The profile is shaped to correspond to a curvature of the first transport roller. A mounting aperture is provided. The aperture is orthogonal to a plane of the plate and spaced a second predetermined distance from a distal end of the attaching portion.

(7) In still a further variant, the attaching portion includes an angled surface at the distal end, the angled surface prevents rotation of the treater element about the mounting aperture.

(8) In yet a further variant, the curved profile of the treating portion further includes at least one projecting finger. The finger extends outwardly toward a distal end of the treating portion.

(9) In another variant of the invention, at least two positioning rods are provided. The positioning rods extend across at least a portion of the width of the transport roller. The positioning rods are sized, shaped and located to fit slidably within the aperture and locate the treater elements adjacent the first transport roller.

(10) In still another variant, a clamping mechanism is provided. The clamping mechanism secures the treater elements slidably located on the positioning rods adjacent the first transport roller.

(11) In yet another variant, the first predetermined distance ranges from 0" to 0.375".

(12) In a further variant, the second predetermined distance ranges from 0" to 0.375".

(13) In still a further variant, the first predetermined thickness ranges from 0.118" to 0.23".

(14) In yet a further variant, the voltage provided to the first front side treater head ranges from 20,000 to 25,000 volts and the current ranges from 8 to 25 amps.

(15) In another variant of the invention, the voltage provided to the second front side treater head ranges from 20,000 to 25,000 volts and the current ranges from 8 to 25 amps.

(16) In still another variant, the voltage provided to the first back side treater head ranges from 20,000 to 25,000 volts and the current ranges from 8 to 25 amps.

(17) In yet another variant, the voltage provided to the second back side treater head ranges from 20,000 to 25,000 volts and the current ranges from 8 to 25 amps.

(18) In a further variant, a method for corona treating film, includes the steps of:

1—obtaining a supply source, the source providing a continuous web of film material for corona treating 2—providing a first transport roller, the first roller is rotatably mounted in a frame, has a first longitudinal axis and has a width greater than the film 3—providing a first front side treater head, the first front side head has a first face, a first leading edge, a first trailing edge, a first width, a first length and is located at a first predetermined distance from the first roller, the first leading edge is parallel to the first axis 4—providing a second front side treater head, the second front side head has a second face, a second leading edge, a second trailing edge, the first width, the first length and is located at the first predetermined distance from the first roller, the second leading edge is parallel to the first axis and spaced from the first trailing edge by a second predetermined distance 5—extruding the film from the supply source, feeding the film over the first transport roller in a first direction 6—providing a high voltage power supply, the power supply providing a high voltage electric current to the first and second front side treater heads 7—grounding the first transport roller and providing a return path for the electric current provided to the first and second front side treater heads 8—wherein a high voltage electric arc will pass through the film in a first path as it moves between the first and second front side treater heads and the first transport roller, thereby corona treating a front side of the film.

(19) In still a further variant the method for corona treating film, further includes the steps of:

1—providing a second transport roller, the second roller is rotatably mounted in the frame, has a second longitudinal axis parallel to and spaced from the first axis and has a width greater than the film 2—providing a first back side treater head, the first back side head has a third face, a third leading edge, a third trailing edge, the first width, the first length and is located at the first predetermined distance from the second roller, the third leading edge is parallel to the second axis 3—providing a second back side treater head, the second back side head has a fourth face, a fourth leading edge, a fourth trailing edge, the first width, the first length and is located at the first predetermined distance from the second roller, the fourth leading edge is parallel to the second axis and spaced from the third trailing edge by the second predetermined distance 4—feeding the film emerging from the first transport roller in the first direction, feeding the film over the second transport roller in a second direction opposite to the first direction and winding the film onto the receiving roller 5—providing a high voltage power supply, the power supply providing a high voltage electric current to the first and second back side treater heads 6—grounding the second transport rollers and providing a return path for the electric current provided to the first and second back side treater heads 7—wherein a high voltage electric arc will pass through the film in a second path as it moves between the first and second back side treater heads and the second transport roller, thereby corona treating a back side of the film.

(20) In yet a further variant, the method for corona treating film further includes the steps of:

1—providing a powered receiving roller, the receiving roller has a longitudinal axis parallel to and spaced from the first axis and has a width greater than the film 2—winding the film emerging from the first transport roller onto the receiving roller.

(21) In another variant of the invention, the method for corona treating film further includes the steps of:

1—providing a powered receiving roller, the receiving roller has a longitudinal axis parallel to and spaced from the first axis and has a width greater than the film 2—winding the film emerging from the second transport roller onto the receiving roller.

(22) In still another variant, the method for corona treating film further includes the step of providing treater heads wherein each of the treater heads comprise at least one treater element, the treater element is of modular design to permit adjustment of a width of treatment area on the film.

(23) In yet another variant, the method for corona treating film further includes the step of providing treater elements that include:

1—a flat plate of electrically conductive material, the plate has a first predetermined thickness, the plate has a treating portion and an attaching portion, the treating portion has a curved profile, the profile shaped to correspond to a curvature of the first transport roller 2—a mounting aperture, the aperture is orthogonal to a plane of the plate and spaced a second predetermined distance from a distal end of the attaching portion.

(24) In a further variant, the method for corona treating film further includes the step of providing treater elements wherein the attaching portion includes an angled surface at the distal end. The angled surface prevents rotation of the treater element about the mounting aperture.

(25) In still a further variant, the method for corona treating film further includes the step of providing treater elements wherein the curved profile of the treating portion further includes at least one projecting finger. The finger extends outwardly toward a distal end of the treating portion.

(26) In yet a further variant, the method for corona treating film further includes the step of providing at least two positioning rods. The positioning rods extend across at least a portion of the width of the transport roller. The positioning rods are sized, shaped and located to fit slidably within the aperture and locate the treater elements adjacent the first transport roller.

(27) In another variant of the invention, the method for corona treating film further includes the step of providing a clamping mechanism. The clamping mechanism secures the treating elements slidably located on the positioning rods adjacent the first transport roller.

(28) In still another variant, the first predetermined distance ranges from 0" to 0.375".

(29) In yet another variant, the second predetermined distance ranges from 0" to 0.375".

(30) In a further variant, the first predetermined thickness ranges from 0.118" to 0.23".

(31) In still a further variant, the method for corona treating film further includes the step of providing voltage to the first front side treater head ranging from 20,000 to 25,000 volts and the current ranges from 8 to 25 amps.

(32) In yet a further variant, the method for corona treating film further includes the step of providing voltage to the second front side treater head ranging from 20,000 to 25,000 volts and the current ranges from 8 to 25 amps.

(33) In another variant of the invention, the method for corona treating film further includes the step of providing voltage to the first back side treater head ranging from 20,000 to 25,000 volts and the current ranges from 8 to 25 amps.

(34) In a final variant, the method for corona treating film further includes the step of providing voltage to the second back side treater head ranging from 20,000 to 25,000 volts and the current ranges from 8 to 25 amps.

Improved adhesion for the surfaces of film treated by the method and apparatus of the present invention can be readily seen by examining test strips provided by the inventor. Ink pens designed to demonstrate the adhesion of printing inks to the film are used on plastic film treated at four increasing dyne levels (46 dyne, 50 dyne, 56 dyne, and 60 dyne). The film is treated in a first region with a first treater head and in a second region with first and second treater heads. As the photo of the treated film shows, the adhesion of the ink to the region treated by the first and second treater heads is more dense, dark and even than is the adhesion of the ink in the region treated by only the first treater head. This improved adhesion is evident at all dyne treatment levels.

An appreciation of the other aims and objectives of the present invention and an understanding of it may be achieved by referring to the accompanying drawings and the detailed description of a preferred embodiment.

DESCRIPTION OF THE DRAWINGS

FIG. 9 is a table illustrating the contact angles for film treated with a single head corona treater and the FIG. 1 dual head corona treater;

DETAILED DESCRIPTION OF THE PREFERRED EMBODIMENT (1) FIGS. 1-7, and 12 illustrate an apparatus for corona treating film 10 providing the desired features that can be assembled from the following components. As illustrated in FIG. 4, supply source 14 is provided. The source 14 provides a continuous web of film material 18 for corona treating. As illustrated in FIGS. 1 and 7, a first transport roller 22 is provided. The first roller 22 is rotatably mounted in a frame 26, has a first longitudinal axis 30 and has a width 34 greater than the film 18. A first front side treater head 38 is provided. The first front side head 38 has a first face 42, a first leading edge 46, a first trailing edge 50, a first width 54, a first length 58 and is located at a first predetermined distance 62 from the first roller 22. The first leading edge 46 is parallel to the first axis 30.

Figure 1:
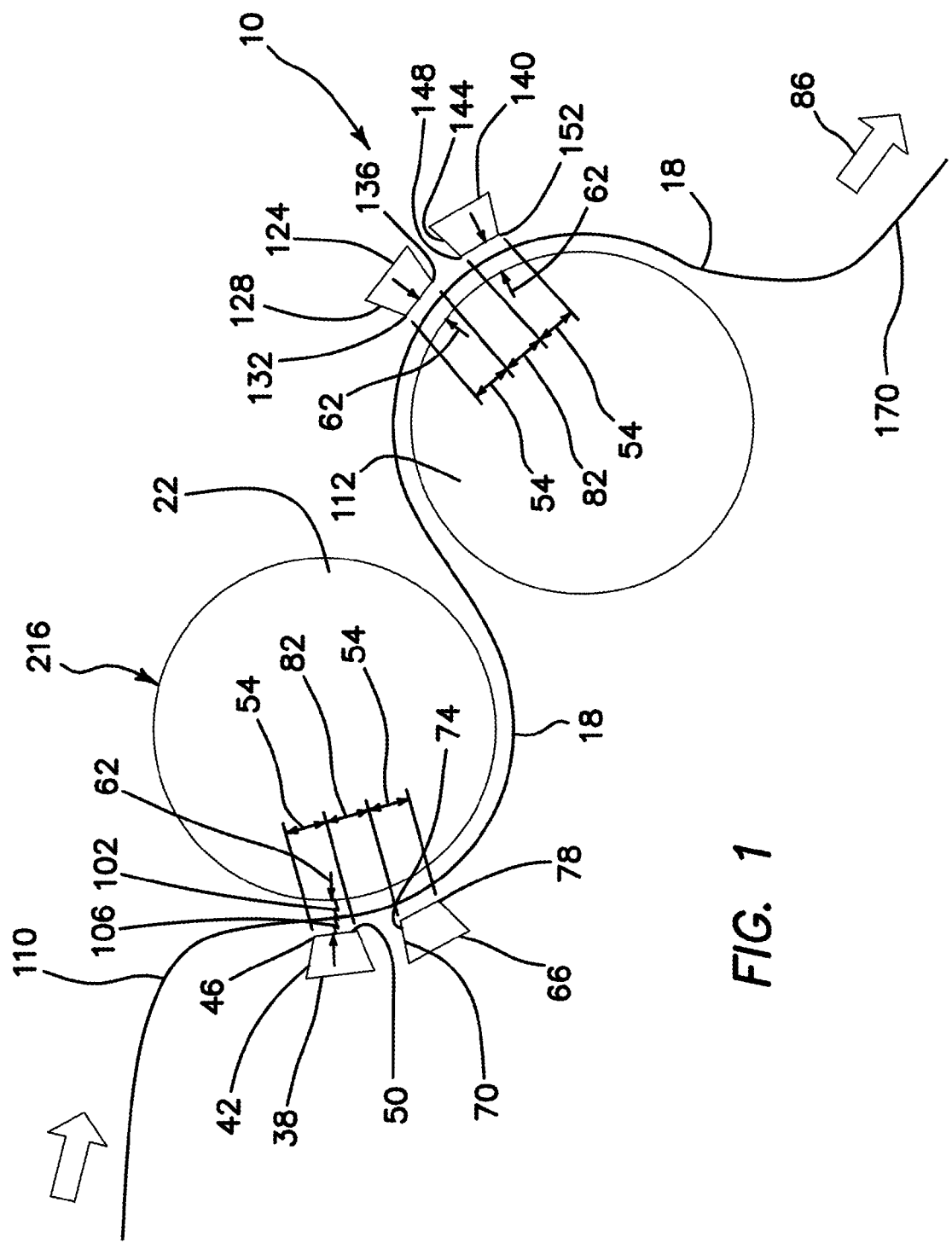
FIG. 1 is a side elevational view of the preferred embodiment of the invention illustrating the path of film for corona treating over first and second rollers and under first and second sets of front side and back side treater heads.
Figure 2:
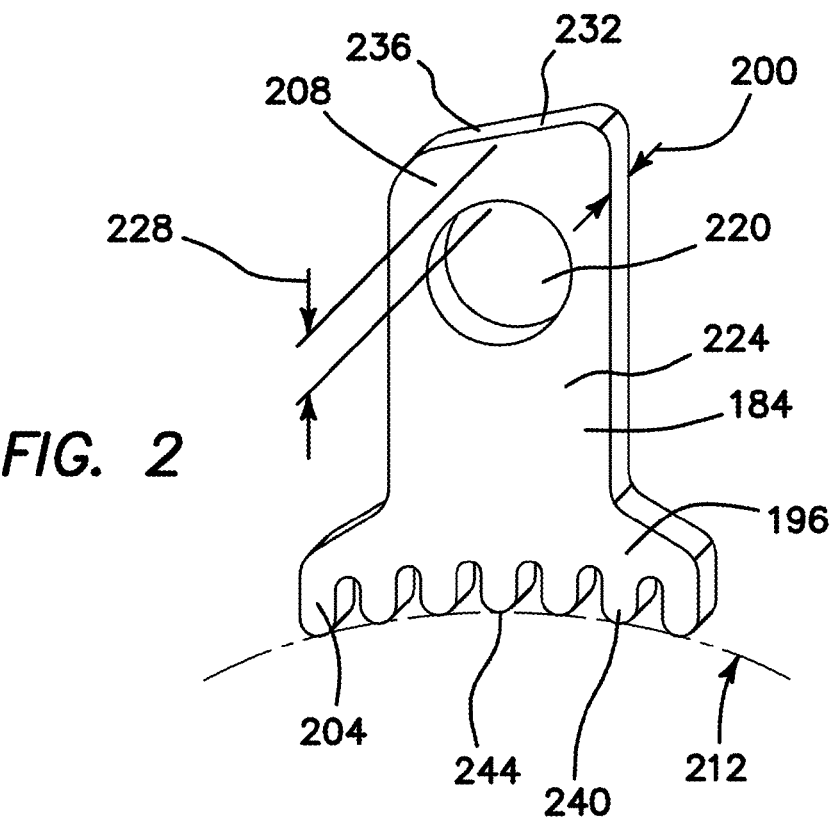
FIG. 2 is a perspective view of a first embodiment of a treater element.
Figure 3:
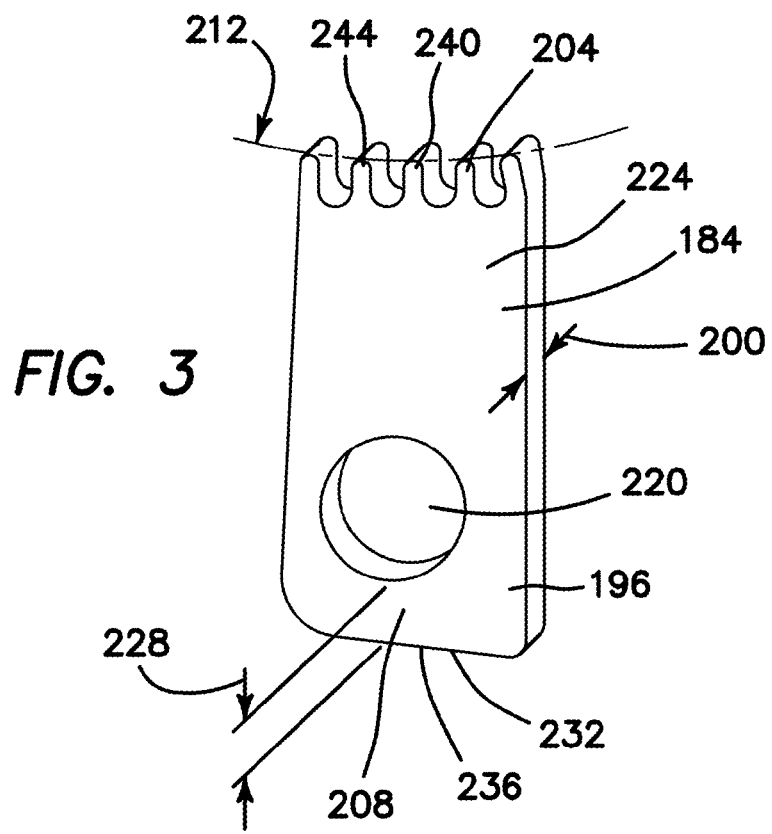
FIG. 3 is a perspective view of a second embodiment of a treater element.

A second front side treater head 66 is provided. The second front side head 66 has a second face 70, a second leading edge 74, a second trailing edge 78, the first width 54, the first length 58 and is located at the first predetermined distance 62 from the first roller 22. The second leading edge 74 is parallel to the first axis 30 and spaced from the first trailing edge 50 by a second predetermined distance 82. The film 18 emerges from the supply source 14, continuing over the first transport roller 22 in a first direction 86. A high voltage power supply 90 is provided. The power supply 90 provides a high voltage electric current 94 to the first 38 and second 66 front side treater heads. The first transport roller 22 is grounded and provides a return path 98 for the electric current 94 provided to the first 38 and second 66 front side treater heads. A high voltage electric arc 102 will pass through the film 18 in a first path 106 as it moves between the first 38 and second 66 front side treater heads and the first transport roller 22, thereby corona treating a front side 110 of the film 18.

Figure 6:
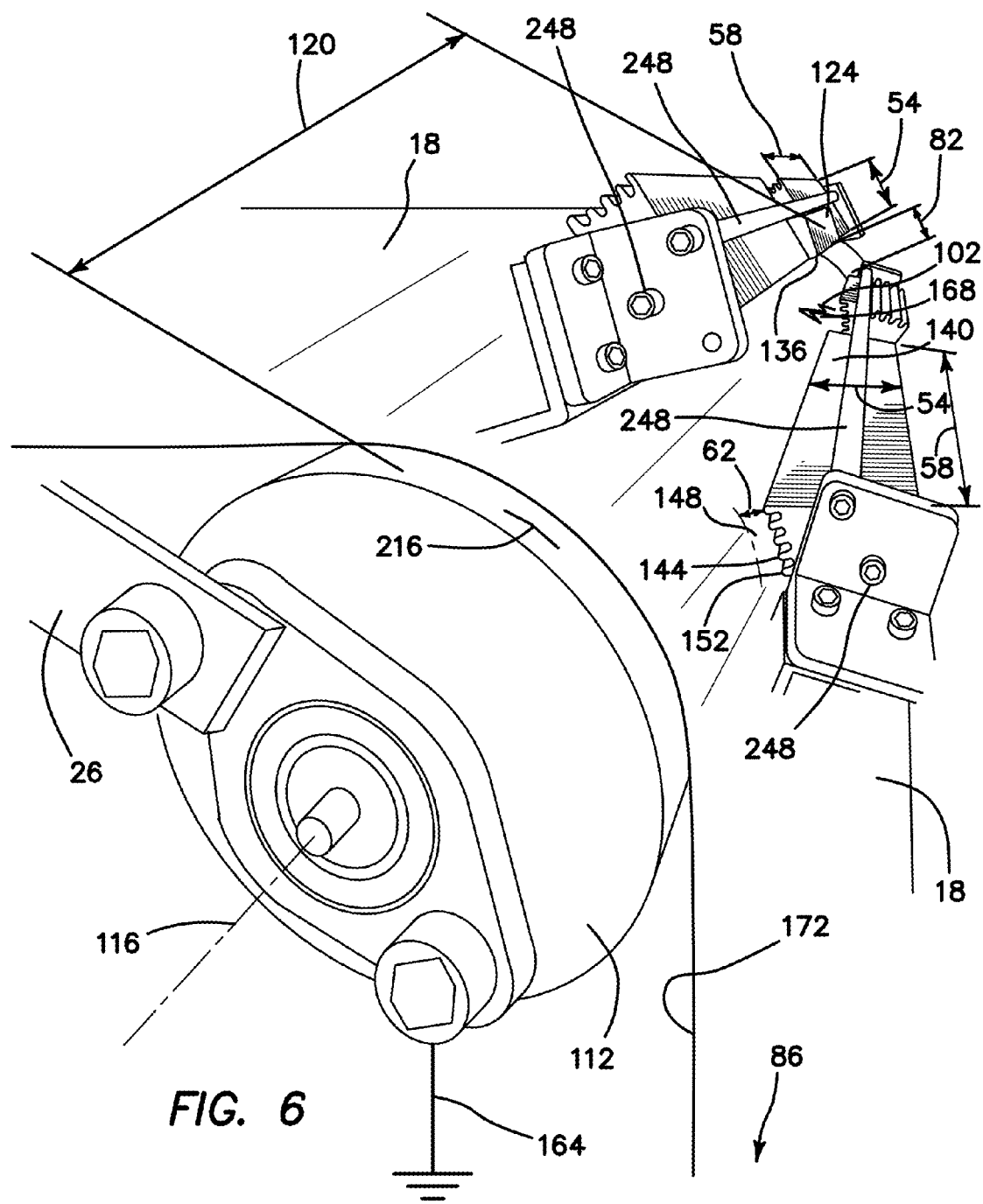
FIG. 6 is a perspective view of the second transport rollers and the first and second back side treater heads.
Figure 12:
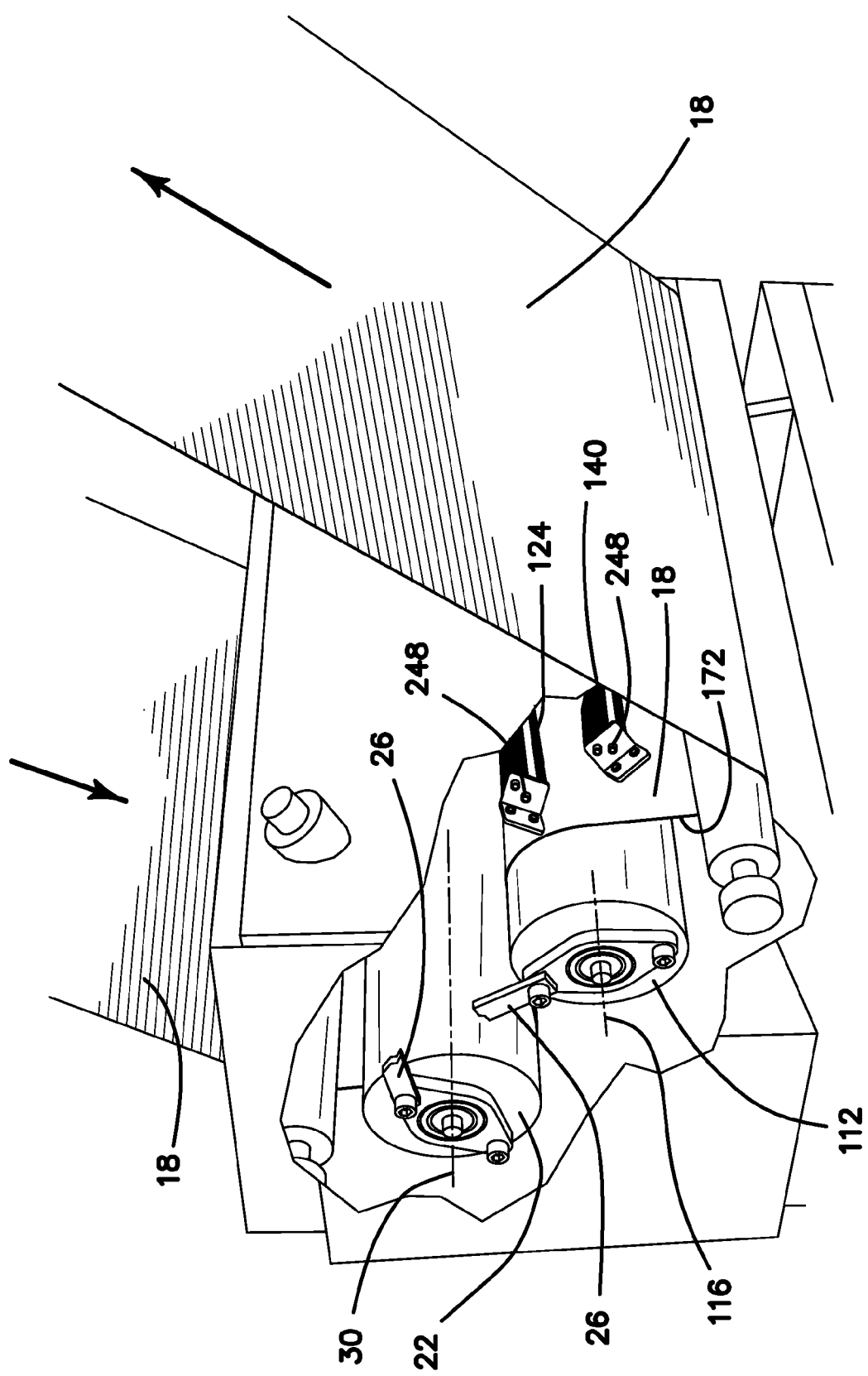
FIG. 12 is a perspective view of the FIG. 1 embodiment illustrating the relative positions of the first and second transport rollers and their respective longitudinal axes.

(2) In a variant of the invention, as illustrated in FIGS. 1, 6 and 12, a second transport roller 112 is provided. The second roller 112 is rotatably mounted in the frame 26, has a second longitudinal axis 116 parallel to and spaced from the first axis 30 and has a width 120 greater than the film 18. A first back side treater head 124 is provided. The first back side head 124 has a third face 128, a third leading edge 132, a third trailing edge 136, the first width 54, the first length 58 and is located at the first predetermined distance 62 from the second roller 112. The third leading edge 132 is parallel to the second axis 116.

A second back side treater head 140 is provided. The second back side head 140 has a fourth face 144, a fourth leading edge 148, a fourth trailing edge 152, the first width 54, the first length 58 and is located at the first predetermined distance 62 from the second roller 112. The fourth leading edge 148 is parallel to the second axis 116 and spaced from the third trailing edge 136 by the second predetermined distance 82. The film 18 emerges from the first transport roller 22 in the first direction 86, continuing over the second transport roller 112 in a second direction 156 opposite to the first direction 86 and is wound onto a receiving roller 160. A high voltage power supply 90 is provided. The power supply 90 provides a high voltage electric current 94 to the first 124 and second 140 back side treater heads. The second transport roller 112 is grounded and provides a return path 164 for the electric current 94 provided to the first 124 and second 140 back side treater heads. A high voltage electric arc 102 will pass through the film 18 in a second path 168 as it moves between the first 124 and second 140 back side treater heads and the second transport roller 112, thereby corona treating a back side 170 of the film 18.

Figure 4:
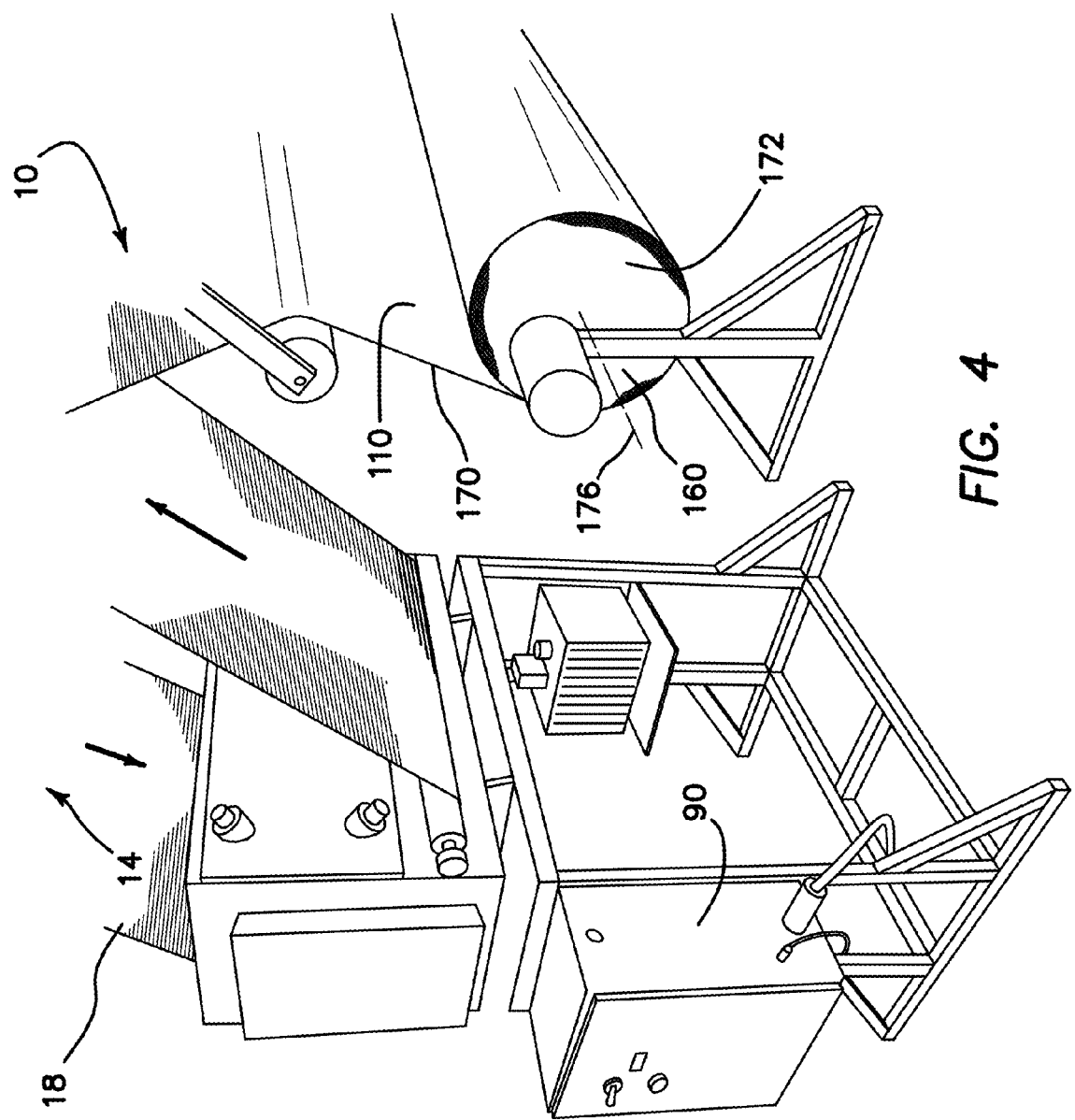
FIG. 4 is a perspective view of the FIG. 1 embodiment including a powered receiving roller.

(3) In another variant, illustrated in FIG. 4, a powered receiving roller 172 is provided. The powered receiving roller 172 has a longitudinal axis 176 parallel to and spaced from the first axis 30 and has a width 180 greater than the film 18. The film 18 emerges from the first transport roller 22 and is wound onto the powered receiving roller 172.

(4) In still another variant, a powered receiving roller 172 is provided. The powered receiving roller 172 has a longitudinal axis 176 parallel to and spaced from the first axis 30 and has a width 180 greater than the film 18. The film 18 emerges from the second transport roller 112 and is wound onto the powered receiving roller 172.

(5) In yet another variant, illustrated in FIGS. 2, 3 and 5-7, the treater heads 38, 66, 124, 140 each include at least one treater element 184. The treater element 184 is of modular design to permit adjustment of a width 188 of treatment area 192 on the film 18.

(6) In a further variant, the treater elements 184 include a flat plate of electrically conductive material 196. The plate 196 has a first predetermined thickness 200. The plate 196 has a treating portion 204 and an attaching portion 208. The treating portion 204 has a curved profile 212. The profile 212 is shaped to correspond to a curvature 216 of the first transport roller 22. A mounting aperture 220 is provided. The aperture 220 is orthogonal to a plane 224 of the plate 196 and spaced a second predetermined distance 228 from a distal end 232 of the attaching portion 208.

(7) In still a further variant, the attaching portion 208 includes an angled surface 236 at the distal end 232, the angled surface 236 prevents rotation of the treater element 184 about the mounting aperture 220.

(8) In yet a further variant, the curved profile 212 of the treating portion 204 further includes at least one projecting finger 240. The finger 240 extends outwardly toward a distal end 244 of the treating portion 204.

Figure 5:
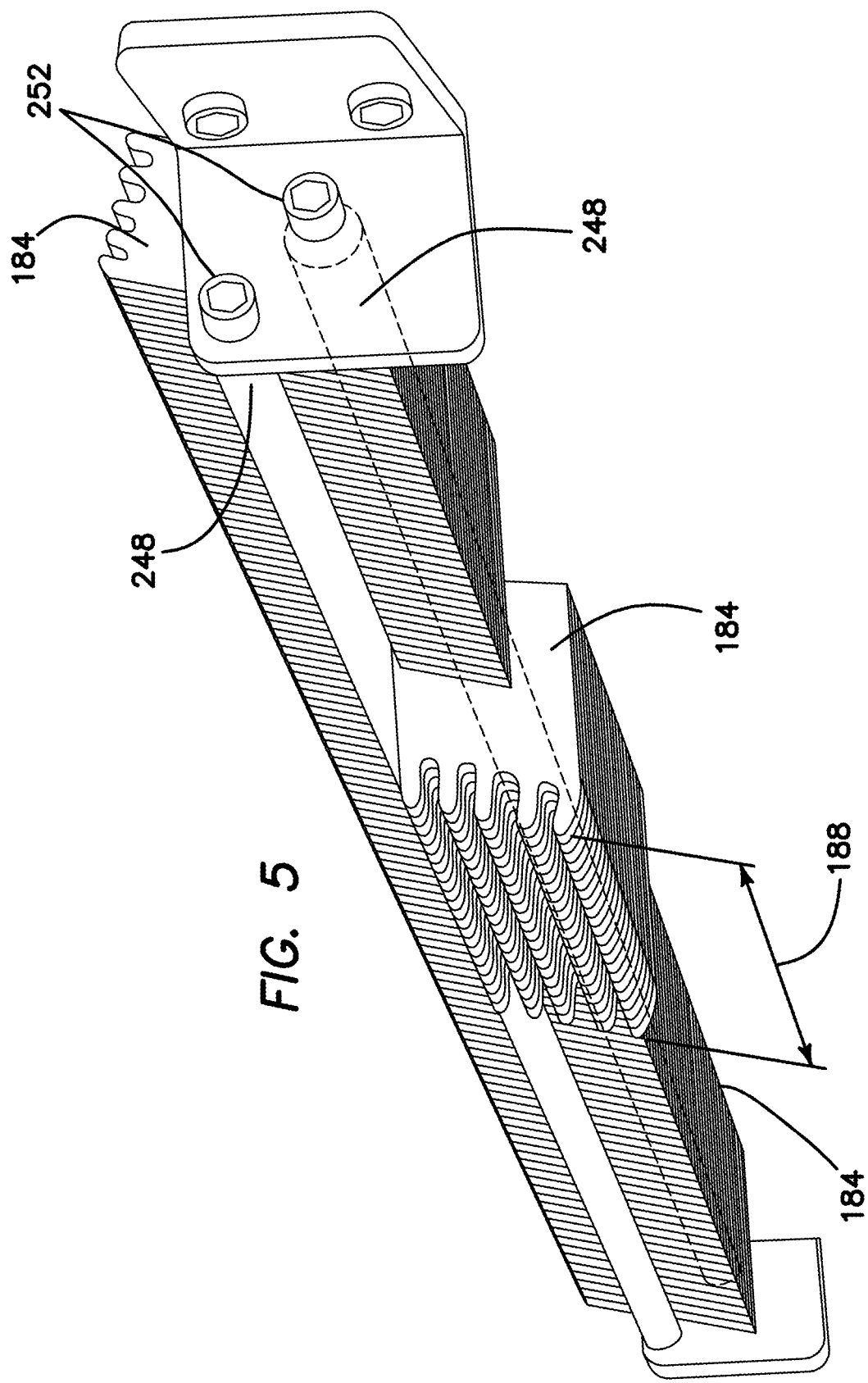
FIG. 5 is a perspective view of a series of treater elements arranged into a treater head.
Figure 7:
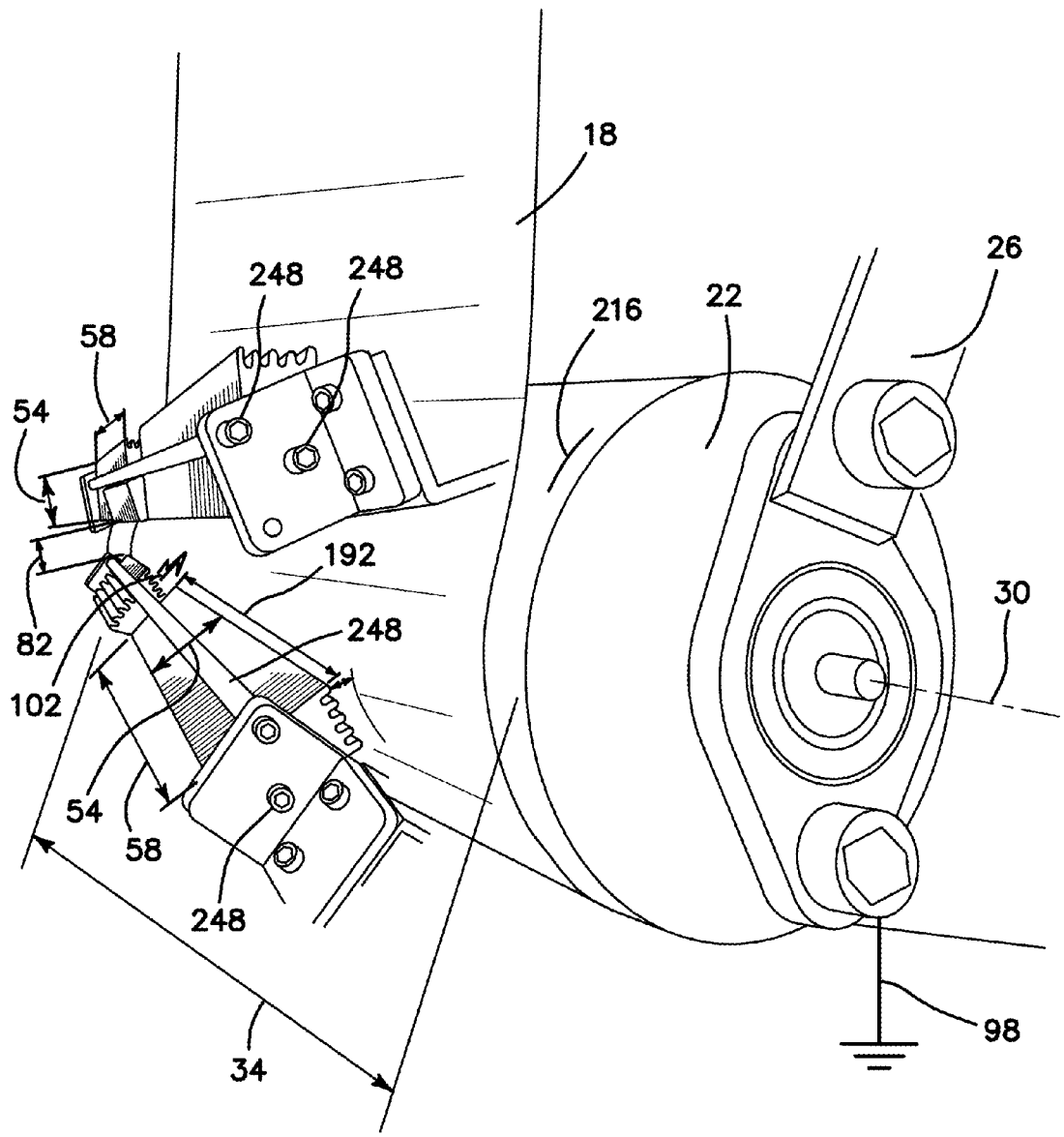
FIG. 7 is a perspective view of the first transport rollers and the first and second front side treater heads.

(9) In another variant of the invention, illustrated in FIGS. 5-7, at least two positioning rods 248 are provided. The positioning rods 248 extend across at least a portion of the width 34 of the transport roller 22. The positioning rods 248 are sized, shaped and located to fit slidably within the aperture 220 and locate the treater elements 184 adjacent the first transport roller 22.

(10) In still another variant, a clamping mechanism 252 is provided. The clamping mechanism 252 secures the treater elements 184 slidably located on the positioning rods 248 adjacent the first transport roller 22.

(11) In yet another variant, illustrated in FIGS. 1, 6 and 7, the first predetermined distance 62 ranges from 0" to 0.375".

(12) In a further variant, the second predetermined distance 82 ranges from 0" to 0.375".

(13) In still a further variant, the first predetermined thickness 200 ranges from 0.118" to 0.23".

(14) In yet a further variant, the voltage provided to the first front side treater head 38 ranges from 20,000 to 25,000 volts and the current ranges from 8 to 25 amps.

(15) In another variant of the invention, the voltage provided to the second front side treater head 66 ranges from 20,000 to 25,000 volts and the current ranges from 8 to 25 amps.

(16) In still another variant, the voltage provided to the first back side treater head 124 ranges from 20,000 to 25,000 volts and the current ranges from 8 to 25 amps.

(17) In yet another variant, the voltage provided to the second back side treater head 140 ranges from 20,000 to 25,000 volts and the current ranges from 8 to 25 amps.

Figure 8:
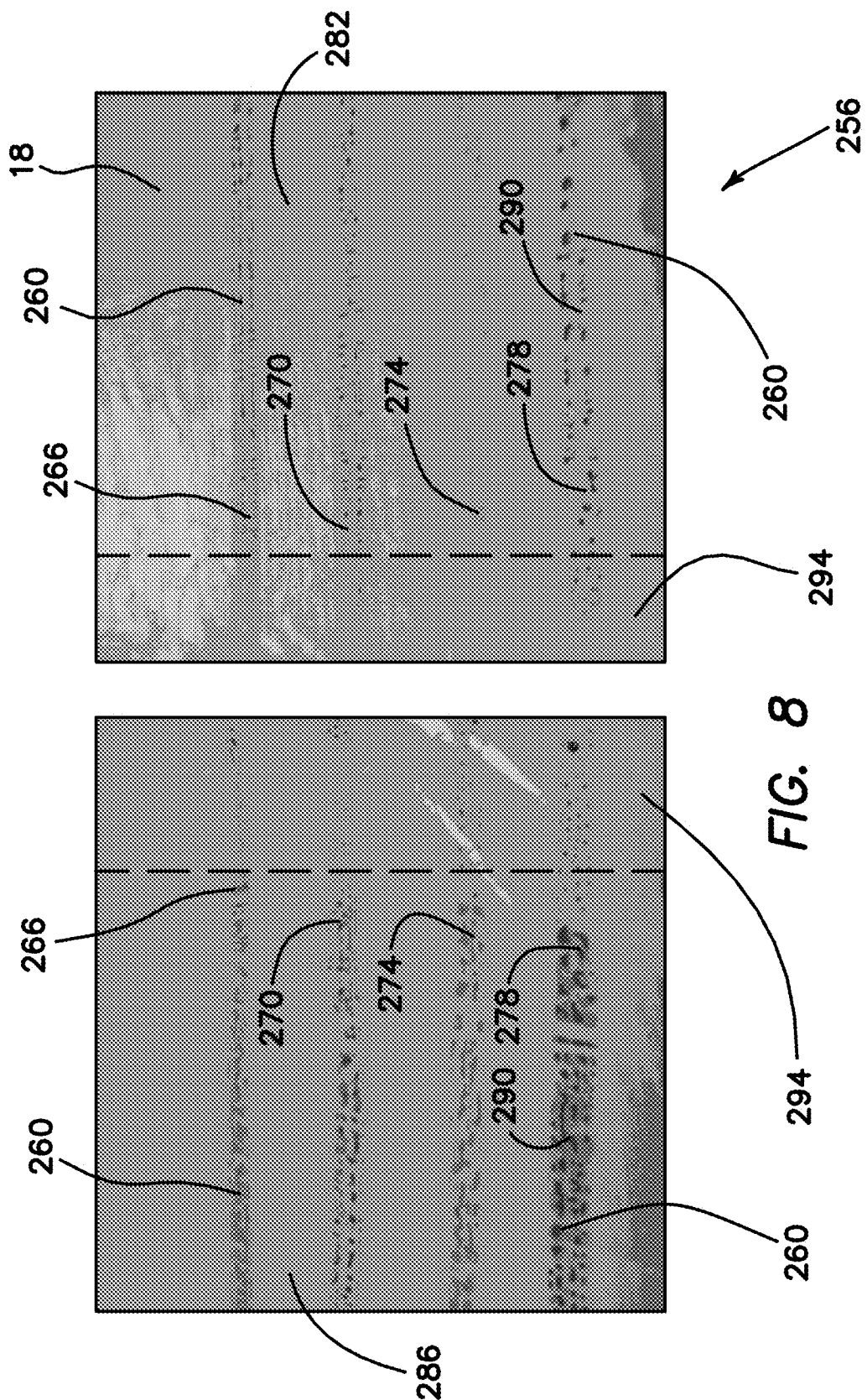
FIG. 8 is a photograph illustrating improved ink adhesion for corona treated film using two treater heads versus one treater head.

As illustrated in FIG. 8, improved adhesion for the surfaces of film 18 treated by the method and apparatus 10 of the present invention can be readily seen by examining test strips 256 provided by the inventor. Ink pens (not shown) designed to demonstrate the adhesion of printing inks 260 to the film 18 are used on film 18 treated at four increasing dyne levels (46 dyne 266, 50 dyne 270, 56 dyne 274, and 60 dyne 278). The film is treated in a first region 282 with the first treater head 38 and in a second region 286 with the first 38 and second 66 treater heads. As the photo of the treated film 290 shows, the adhesion of the ink 260 to the region 286 treated by the first 38 and second 66 treater heads is more dense, dark and even than is adhesion of the ink in the region 282 treated by only the first treater head 38. The two regions are bordered by untreated areas 294. This improved adhesion is evident at all dyne treatment levels 266, 270, 274, 278. Ink pens are used to test the relative adhesion of film surfaces for ink, however, it is important to note that films that provide improved adhesion for ink also provide increased adhesion for other pieces of film. This is useful in producing self-opening film bags in which a first bag is releasably adhered to a second bag and causes it to open when the first bag is pulled from a dispenser or rack. The improved adhesion demonstrated in FIG. 8, is the unexpected result of use of the dual corona treater apparatus and method described that makes the present invention novel and non-obvious.

In order to further demonstrate the improved adhesion for the surfaces of film 18 treated by the method and apparatus 10 of the present invention, the Applicant engaged Douglas Hirt, Ph.D. of the Department of Chemical and Biomolecular Engineering of the Center for Advanced Engineering Fibers and Films at Clemson University. According to Dr. Hirt, "The contact angle of a liquid droplet on a solid substrate provides an indication of the wettability and energy of the solid. In general, with all other things being equal, a lower water contact angle is indicative of a more hydrophilic (higher surface energy) surface. Note also that many researchers evaluate the wettability or, more formally, the work of adhesion (WoA) as being proportional to the cosine of the contact angle (i.e., a lower contact angle gives a greater WoA)."

Figure 10:
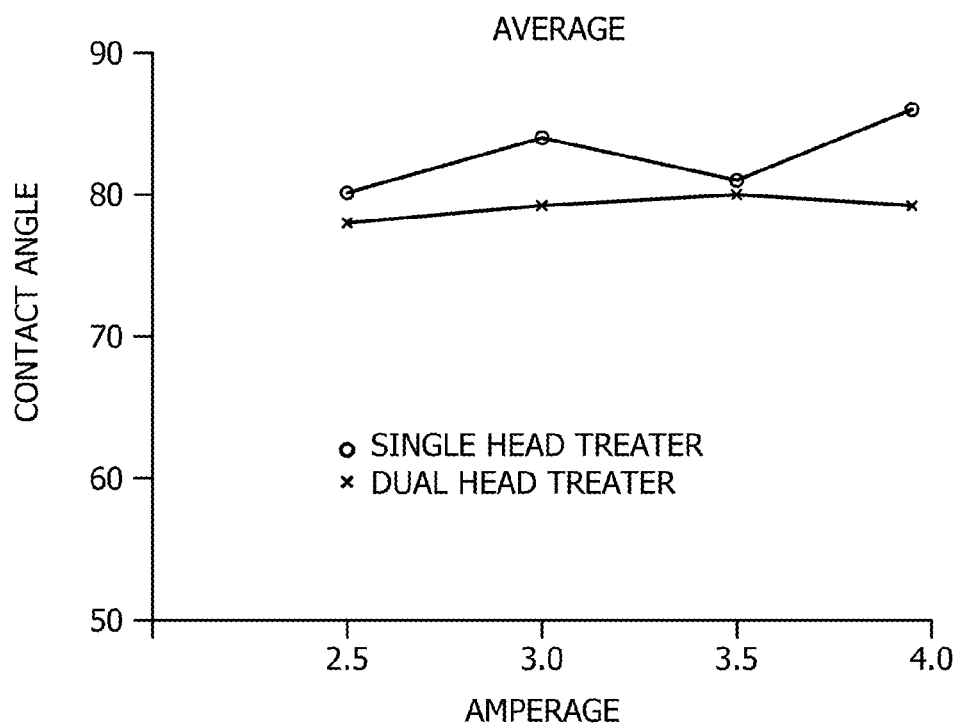
FIG. 10 is a chart illustrating the average contact angles for film treated with single and dual corona treater heads.
Figure 11:
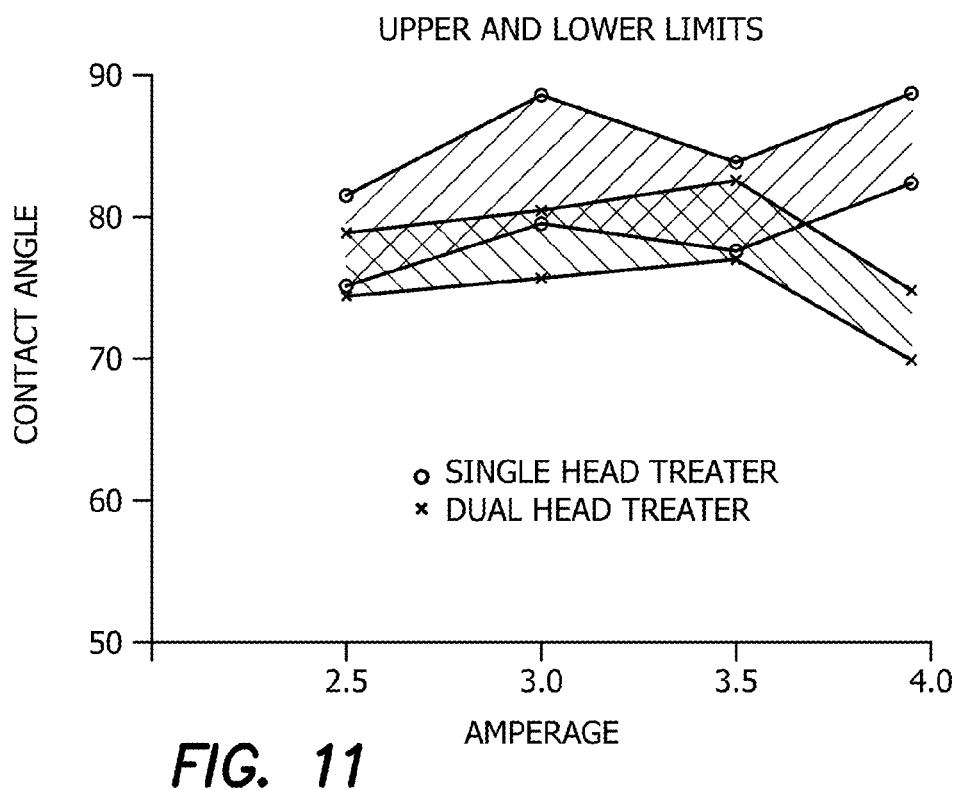
FIG. 11 is a chart illustrating the upper and lower limit contact angles for film treated with single and dual corona treater heads.

In the tests conducted by Dr. Hirt, eight film samples were tested. Of these eight samples, four were treated with a single head corona treater at 2.5, 3.0, 3.5 and 3.9 amps at approximately 23,000 volts. The remaining four samples were treated with a dual head corona treater at the same current and voltage settings. In the test procedures the static water contact angle between the film surface and at least six water droplets was measured for each film sample using a Kruss Drop Shape Analysis System (Model 10-Mk2). High, low and average values were measured for each sample. As can be seen in the FIG. 9 table and in the FIGS. 10 and 11 graphs, the contact angle and hence the wettability or the work of adhesion is consistently less for the film samples treated with the dual head corona treater when compared with the single head treater. As such, these test results serve to verify that the present invention provides both an unexpected result and an improvement over the prior art.

The apparatus for corona treating film 10 has been described with reference to particular embodiments. Other modifications and enhancements can be made without departing from the spirit and scope of the claims that follow.

The invention claimed is:

1. An apparatus for corona treating film, comprising:
   a supply source, said source providing a continuous web of film material for corona treating;
   a first transport roller, said first roller being rotatably mounted in a frame, having a first longitudinal axis and having a width greater than said film;
   a first front side treater head, said first front side head having a first face, a first leading edge, a first trailing edge, a first width, a first length and being disposed at a first predetermined distance from said first roller, said first leading edge being parallel to said first axis;
   a second front side treater head, said second front side head having a second face, a second leading edge, a second trailing edge, said first width, said first length and being disposed at said first predetermined distance from said first roller, said second leading edge being parallel to said first axis and spaced from said first trailing edge by a second predetermined distance;

said treater heads each comprise at least one treater element, said treater element being of modular design to permit adjustment of a width of treatment area on said film;

said treater elements comprise a flat plate of electrically conductive material, said plate having a first predetermined thickness;

said plate having a treating portion and an attaching portion;

said treating portion having a curved profile, said profile shaped to correspond to a curvature of said first transport roller; and a mounting aperture, said aperture being orthogonal to a plane of said plate and spaced a second predetermined distance from a distal end of said attaching portion;

at least two positioning rods, said positioning rods extending across at least a portion of said width of said transport roller;

said positioning rods being sized, shaped and disposed to fit slidably within said aperture and locate said treater elements adjacent said first transport roller;

said film emerging from said supply source, continuing over said first transport roller in a first direction;

a high voltage power supply, said power supply providing a high voltage electric current to said first and second front side treater heads;

said first transport roller being grounded and providing a return path for said electric current provided to said first and second front side treater heads; and wherein a high voltage electric arc will pass through said film in a first path as it moves between said first and second front side treater heads and said first transport roller, thereby corona treating a front side of said film.

2. The apparatus for corona treating film, as described in claim 1, further comprising:

a second transport roller, said second roller being rotatably mounted in said frame, having a second longitudinal axis parallel to and spaced from said first axis and having a width greater than said film;

a first back side treater head, said first back side head having a third face, a third leading edge, a third trailing edge, said first width, said first length and being disposed at said first predetermined distance from said second roller, said third leading edge being parallel to said second axis;

a second back side treater head, said second back side head having a fourth face, a fourth leading edge, a fourth trailing edge, said first width, said first length and being disposed at said first predetermined distance from said second roller, said fourth leading edge being parallel to said second axis and spaced from said third trailing edge by said second predetermined distance;

said film emerging from said first transport roller in said first direction, continuing over said second transport roller in a second direction opposite to said first direction and being wound onto a receiving roller;

a high voltage power supply, said power supply providing a high voltage electric current to said first and second back side treater heads;

said second transport roller being grounded and providing a return path for said electric current provided to said first and second back side treater heads; and wherein a high voltage electric arc will pass through said film in a second path as it moves between said first and second back side treater heads and said second transport roller, thereby corona treating a back side of said film.

3. The apparatus for corona treating film, as described in claim 1, further comprising:

a powered receiving roller, said powered receiving roller having a longitudinal axis parallel to and spaced from said first axis and having a width greater than said film; and said film emerging from said first transport roller and being wound onto said powered receiving roller.

4. The apparatus for corona treating film, as described in claim 2, further comprising:

a powered receiving roller, said powered receiving roller having a longitudinal axis parallel to and spaced from said first axis and having a width greater than said film; and said film emerging from said second transport roller and being wound onto said powered receiving roller.

5. The apparatus for corona treating film, as described in claim 1, wherein said attaching portion comprises an angled surface at said distal end, said angled surface preventing rotation of said treater element about said mounting aperture.

6. The apparatus for corona treating film, as described in claim 1, wherein said curved profile of said treating portion further comprises at least one projecting finger, said finger extending outwardly toward a distal end of said treating portion.

7. The apparatus for corona treating film, as described in claim 1, further comprising a clamping mechanism, said clamping mechanism securing said treater elements slidably located on said positioning rods adjacent said first transport roller.

8. The apparatus for corona treating film, as described in claim 1, wherein said first predetermined distance ranges from 0" to 0.375".

9. The apparatus for corona treating film, as described in claim 1, wherein said second predetermined distance ranges from 0" to 0.375".

10. The apparatus for corona treating film, as described in claim 1, wherein said first predetermined thickness ranges from 0.118" to 0.23".

11. The apparatus for corona treating film, as described in claim 1, wherein the voltage provided to the first front side treater head ranges from 20,000 to 25,000 volts and the current ranges from 8 to 25 amps.

12. The apparatus for corona treating film, as described in claim 1, wherein the voltage provided to the second front side treater head ranges from 20,000 to 25,000 volts and the current ranges from 8 to 25 amps.

13. The apparatus for corona treating film, as described in claim 2, wherein the voltage provided to the first back side treater head ranges from 20,000 to 25,000 volts and the current ranges from 8 to 25 amps.

14. The apparatus for corona treating film, as described in claim 2, wherein the voltage provided to the second back side treater head ranges from 20,000 to 25,000 volts and the current ranges from 8 to 25 amps.

15. A method for corona treating film, comprising the steps of:

obtaining a supply source, said source providing a continuous web of film material for corona treating;

providing a first transport roller, said first roller being rotatably mounted in a frame, having a first longitudinal axis and having a width greater than said film;

providing a first front side treater head, said first front side head having a first face, a first leading edge, a first trailing edge, a first width, a first length and being disposed at a first predetermined distance from said first roller, said first leading edge being parallel to said first axis;

providing a second front side treater head, said second front side head having a second face, a second leading edge, a second trailing edge, said first width, said first length and being disposed at said first predetermined distance from said first roller, said second leading edge being parallel to said first axis and spaced from said first trailing edge by a second predetermined distance;

said treater heads each comprise at least one treater element, said treater element being of modular design to permit adjustment of a width of treatment area on said film;

said treater elements comprise a flat plate of electrically conductive material, said plate having a first predetermined thickness;

said plate having a treating portion and an attaching portion;

said treating portion having a curved profile, said profile shaped to correspond to a curvature of said first transport roller; and a mounting aperture, said aperture being orthogonal to a plane of said plate and spaced a second predetermined distance from a distal end of said attaching portion;

providing at least two positioning rods, said positioning rods extending across at least a portion of said width of said transport roller;

said positioning rods being sized, shaped and disposed to fit slidably within said aperture and locate said treater elements adjacent said first transport roller;

extruding said film from said supply source, feeding said film over said first transport roller in a first direction;

providing a high voltage power supply, said power supply providing a high voltage electric current to said first and second front side treater heads;

grounding said first transport roller and providing a return path for said electric current provided to said first and second front side treater heads; and wherein a high voltage electric arc will pass through said film in a first path as it moves between said first and second front side treater heads and said first transport roller, thereby corona treating a front side of said film.

16. The method for corona treating film, as described in claim 15, further comprising the steps of:

providing a second transport roller, said second roller being rotatably mounted in said frame, having a second longitudinal axis parallel to and spaced from said first axis and having a width greater than said film;

providing a first back side treater head, said first back side head having a third face, a third leading edge, a third trailing edge, said first width, said first length and being disposed at said first predetermined distance from said second roller, said third leading edge being parallel to said second axis;

providing a second back side treater head, said second back side head having a fourth face, a fourth leading edge, a fourth trailing edge, said first width, said first length and being disposed at said first predetermined distance from said second roller, said fourth leading edge being parallel to said second axis and spaced from said third trailing edge by said second predetermined distance;

feeding said film emerging from said first transport roller in said first direction, feeding said film over said second transport roller in a second direction opposite to said first direction and winding said film onto said receiving roller;

providing a high voltage power supply, said power supply providing a high voltage electric current to said first and second back side treater heads;

grounding said second transport rollers and providing a return path for said electric current provided to said first and second back side treater heads; and wherein a high voltage electric arc will pass through said film in a second path as it moves between said first and second back side treater heads and said second transport roller, thereby corona treating a back side of said film.

17. The method for corona treating film, as described in claim 15, further comprising the steps of:

providing a powered receiving roller, said receiving roller having a longitudinal axis parallel to and spaced from said first axis and having a width greater than said film; and winding said film emerging from said first transport roller onto said receiving roller.

18. The method for corona treating film, as described in claim 16, further comprising the steps of:

providing a powered receiving roller, said receiving roller having a longitudinal axis parallel to and spaced from said first axis and having a width greater than said film; and winding said film emerging from said second transport roller onto said receiving roller.

19. The method for corona treating film, as described in claim 15, further comprising the step of providing treater elements wherein said attaching portion comprises an angled surface at said distal end, said angled surface preventing rotation of said treater element about said mounting aperture.

20. The method for corona treating film, as described in claim 15, further comprising the step of providing treater elements wherein said curved profile of said treating portion further comprises at least one projecting finger, said finger extending outwardly toward a distal end of said treating portion.

21. The method for corona treating film, as described in claim 15, further comprising the step of providing a clamping mechanism, said clamping mechanism securing said treating elements slidably located on said positioning rods adjacent said first transport roller.

22. The method for corona treating film, as described in claim 15, wherein said first predetermined distance ranges from 0" to 0.375".

23. The method for corona treating film, as described in claim 15, wherein said second predetermined distance ranges from 0" to 0.375".

24. The method for corona treating film, as described in claim 15, wherein said first predetermined thickness ranges from 0.118" to 0.23".

25. The method for corona treating film, as described in claim 15, further comprising the step of providing voltage to the first front side treater head ranging from 20,000 to 25,000 volts and the current ranges from 8 to 25 amps.

26. The method for corona treating film, as described in claim 15, further comprising the step of providing voltage to the second front side treater head ranging from 20,000 to 25,000 volts and the current ranges from 8 to 25 amps.

27. The method for corona treating film, as described in claim 16, further comprising the step of providing voltage to the first back side treater head ranging from 20,000 to 25,000 volts and the current ranges from 8 to 25 amps.

28. The method for corona treating film, as described in claim 16, further comprising the step of providing voltage to the second back side treater head ranging from 20,000 to 25,000 volts and the current ranges from 8 to 25 amps.

* * * * *